United States Patent [19]

Cepeda-Guerra

[11] Patent Number: 5,451,620
[45] Date of Patent: Sep. 19, 1995

[54] METHODS OF PRODUCING LIGHT WEIGHT CEMENT-LIKE BUILDING PRODUCTS

[76] Inventor: Hector Cepeda-Guerra, Torreon, Coahuila, Mexico

[21] Appl. No.: 224,557

[22] Filed: Apr. 7, 1994

[51] Int. Cl.$^6$ ............................................... C08L 67/00
[52] U.S. Cl. ..................... 523/514; 523/148; 523/171; 524/425; 524/427; 524/451; 524/492; 524/493
[58] Field of Search ........................ 523/148, 514, 171; 524/425, 427, 451, 492, 493

[56] References Cited

U.S. PATENT DOCUMENTS 5,244,941 9/1993 Bruckbauer et al. ............... 523/171

*Primary Examiner*—Edward Cain
*Attorney, Agent, or Firm*—Laurence R. Brown

[57] ABSTRACT

This invention is related to a procedure to produce paste for stone quarry, calcareous stones and other porous stony finishing, similar to cement or mortar, which comprises the combination of resin with calcium carbonate, silica grit or river sand aggregate, to give body to the resin. The aggregate can be mixed with cement and be pigmented in different colors and milled in diverse grain sizes for example, to obtain a perfect copy of stone quarry. It is possible also, to use additives like cobalt and catalysts to protect resin from ultraviolet rays or from flames, in case the binding paste comes in contact with fire.

Additionally, the binding paste comprises quantities of water to produce cavities for porosity. It also contains a silica product named Aerosil, which allows the paste to become more dense to help its laying in the mold, without the necessity to pour as a liquid. If the paste is too dense it can be diluted with monomers.

Detergent is used to ease the laying of the paste in the mold by hand. Fiberglass filament is used to improve the mechanical qualities.

14 Claims, No Drawings

METHODS OF PRODUCING LIGHT WEIGHT CEMENT-LIKE BUILDING PRODUCTS

BACKGROUND OF THE INVENTION

In the prior art, binding pastes are produced to imitate calcareous brilliant stones without pores (like marble, onyx, and alabaster) and natural granites. For its imitation, gel coat is prepared making the designs of marble and onyx. Subsequently a paste is prepared with calcium carbonate and polyester with the additives to set. It is poured into the mold and vibrated for air expulsion, to eliminate cavities or porosity.

Alabaster is used in ornamental figures. It is made with polyester resins, alabaster, or fine marble powder and white pigment for resin. Such a mixture is poured into the mold, demolded and polished. To remove voids and bubbles, the uncured mixture goes through a vacuum chamber.

There are two procedures for imitating natural granite:

Blocks of polyester with calcium carbonate are prepared in several colors. They are milled and the grain size and color is selected. Once this is done, they are amalgamated in a basic color paste, previously passed in both cases through a vacuum chamber to avoid bubbles and voids. The paste mixture is then poured into molds. With appropriate cutting machines they are processed similarly to marble.

The second method consists in making a calcium carbonate and polyester resin paste, which then is poured into a mold (bathtub, sink, etc.). You get tiny polyester grains of different colors, mix them with liquid polyester and apply scattering with an air pistol, as if you were painting with polyester.

Former procedures are known as cultured stone for furniture and accessories and in all cases they are materials without porosity, made in one whole piece. The pieces have no joints, with the exception of granite that is worked like marble, and cultured stone is not moldable during manufacture.

The present invention has many advantages. An outstanding one is the fact that the product is not dependent upon contents of a stone quarry. The product is produced artificially. Pastes present versatility for making furniture, accessories, steel structure facades, and restoration of buildings such as historic monuments. It has durability, and does not contain biodegradable materials. The finished products require little maintenance because they don't have to be polished, and subsequently they retain brightness. The products are extremely cheaper than natural carved stone. They are easy to install, with less weight than the natural stone. With the present invention you can make any ornamentation, although complex, since molds can be reused. The products also reduce costs and give a favorable appearance.

On the other hand, artificial stone actually made with cement and different kinds of natural milled stone or with cement and other colored calcareous stones, require twenty four hours in the mold, while with this invention two hours are enough.

DESCRIPTION OF THE INVENTION

This invention is related to the preparation of paste for different kinds of quarried stone and calcareous stones made from polyester resins, together with molding and finishing methods. Between 15 and 30% polyester resin is used depending on the size of the grain. When the grain is coarser, less resin is used. Subsequently it is colored with pigments for resins and other pigments called soil for cement and lime. It is mixed in a blade mixer until the color is uniform and at this moment the grains are added (calcium carbonate, river sand or silica, ground glass, etc.) beginning from small to large grain sizes. The mixture is thinned with water, without forming a dough, so that in the exothermic drying reaction, air bubbles are trapped to form cavities.

To produce certain textures in the load of larger granules (grain size), the proportions of calcium carbonate and colored cement vary. Subsequently, in a resin for general use, you add Aerosil in a proportion of 50 grams per kilogram of resin, and a monomer to dilute the paste in a proportion of 10 to 20 percent. To give strength to the paste, fiberglass filaments are utilized according to the wanted mechanical properties. If rigidity in the paste is wanted, the proportion of filaments is increased.

Finally the catalyst is added to the paste in a proportion according to atmospheric temperature, which varies from 5 to 7.5 parts per thousand. This proportion is also according to the resin weight, that is, with more temperature, less proportion of catalyst and vice versa.

The exact formation of a stony finished product, also known as cement or mortar, which was formerly produced with lime and sand, and in its natural form is known as limestone and sandstone is described.

Basic formula with 1 Kilogram resin for general use:

| Basic formula with 1 Kilogram resin for general use: | |
| --- | --- |
| 1000 | grams resin |
| 255 | grams monomers |
| 555.6 | grams calcium carbonate talc |
| 555.6 | grams calcium carbonate in marble debris mesh |
| 750 | grams river sand |
| 1222.5 | grams calcium carbonate in a grain thickness of 1/16 to 3/32 of mesh. |
| 26.66 | grams white pigment for resins |
| 50 | grams Aerosil |
| *5 | grams cobalt |
| *5 | grams catalyst |

*Ideal proportions for Mexico's weather.

METHOD OF APPLICATION AND PASTE MOLDING

Usually a surface is made by pouring a liquid paste. In the present case the molding can be done in the same way, however you have to mold the thinnest and lightest surface layer possible. Thus, the paste is not poured into the mold but it is manually applied, utilizing soap foam as a lubricant, to prevent the paste from sticking to the hands. The foam also helps to give porosity in the finished product.

A very important property of the present invention is that when the uncured paste is applied, it remains adhered without curing, in spite of gravity. Namely it is self adhering upon contact, without having to cure to surfaces on which it is applied, for example an arch of 5 meters in diameter with an arch greater than 1 meter.

It is essential that the paste is totally applied into the mold before setting, for the contraction movements will be uniform and this variable will be controlled. Because of contraction, a piece can be made of segmented molds, for example, a column 5 meters high.

In case contraction produces cracks, it is not possible to repair in the mold, but in the demolded piece, repairs are made with paste of the same characteristics for drying and is of the same mixture proportions. Finally a repair is ground with emery or abrasives.

INSTALLATION METHOD OF PRODUCED PIECES, FOR CONSTRUCTION AND ORNAMENT

For construction purposes, models and mold sections are made in natural scale or size. Models must not be sectioned. Mold sections can form the model. In such cases, the paste is applied exceeding the edges of the molds to serve as a seam register. Registers extend from the different sections. Their form is not important. They make pairs to match the sequence of the pieces and define the dimensions of the joints. In case of error, by contraction, segments can be repaired filling in seams by regilding. If the stone is carved, any increased dimension is formed by hand.

To lay the pieces in the building structure, two procedures can be followed according with the building nature:

A) Concrete building.

In the rear part of the piece and with the same paste, wire anchors are applied and once the pieces are secured together the wires are filled with liquid concrete and compressed with polyetyrene pearl stone.

B) Steel structure building.

In the rear part of the pieces, pipes or rods of any form are secured, with the paste. Thus, the pieces can be soldered to the columns, crossbeam or wire mesh, and serve as a wall.

Two procedures are followed to obtain the stone or porous calcareous finishing with the present paste:

A) In the factory, the piece is ground after getting out of the mold. It is exposed to hydrochloric acid to produce corrosion and to open holes and cavities.

B) With an air compressor of high pressure and a minimum continuous flow of 120 pounds, the material is sand blasted to produce pores and cavities.

This invention, encompasses procedures to produce pastes for quarry products based on polyester resins, the methods of application and molding and the methods of installing pieces, both ornamental and for construction, thus evidencing innovations that revolutionize foundations for modern construction, particularly ornamental construction.

All foundations are made in the factory thus constituting a construction innovation, providing the market with shaped pre manufactured foundation like: columns, "chambranas", cornices, friezes, window moldings, doors, ceilings, rosettes for lamps, chimneys and the like.

With this material some additional advantages are the low weight for transportation, saving in installation because pieces are complete and measured, the product lasts longer than natural products because it is not biodegradable; it has enough elongation to resist telluric movement better than natural material; and if you want to change the shape, this can be done with the same paste in an other color and there will be no loosening of pieces. Because of stacking characteristics of pieces, exportation is easy and storage can be outdoors.

It is not my intention to reduce the scope of the invention to this description, but to claim those procedures, moldings and finishing methods, that follow the described principles and produce the mentioned results.

What I claim is:

1. The method of producing cement like building products comprising the steps of:
   mixing calcium carbonate, silica grit, sand, and polyester resins, and
   adding water to form a moldable paste comprising an exothermic self adhering uncured composition that can be molded by hand and which cures within two hours into a light weight product produced by exothermic reaction of the water to entrap air bubbles making the product porous.

2. The method of claim 1 further comprising the step of:
   manually kneading the uncured paste with soap foam on the hands.

3. The method of claim 1 further comprising the step of:
   applying the kneaded uncured paste to a cured product for obtaining a surface design.

4. The method of claim 1 further comprising the steps of:
   applying the kneaded uncured paste to a cured product to repair a crack, letting the uncured paste cure in-situ and grinding the surface after the paste is cured.

5. The method of claim 1 further comprising the step of:
   adding cobalt to the mixture for fireproofing.

6. The method of claim 1 further comprising the step of:
   adding fiberglass to the mixture for strength and rigidity of the cured product.

7. The method of claim 1 further comprising the step of:
   adding pigments to the mixture for simulating quarried products in the cured product.

8. The method of claim 1 further comprising the step of:
   treating the surface of the cured product by sandblasting to expose open cavities formed by the air bubbles.

9. The method of claim 1 further comprising the step of:
   treating the surface of the cured product with hydrochloric acid to expose open cavities formed by the air bubbles.

10. The method of claim 1 further comprising the step of:
    self-adhering the uncured paste to an arch to cure in place.

11. The method of claim 1 further comprising the steps of:
    securing the cured product to a concrete building structure by securing wire anchors between the concrete building and cured product by said uncured paste and letting the uncured paste cure in-situ.

12. The method of claim 1 further comprising the steps of:
    securing the cured product to a steel building structure by securing metallic members to the cured product by said uncured paste, and letting the uncured paste cure in-situ.

13. The method of claim 1 further comprising the step of:
    adding quarried stones to the mixture to simulate quarried products.

14. The method of claim 1 further comprising the step of:
    producing an artistic three dimensional design on the surface of the paste and curing the design in place.

* * * * *